(12) United States Patent
Stell et al.

(10) Patent No.: US 11,820,110 B2
(45) Date of Patent: Nov. 21, 2023

(54) POLYMERIC FILMS AND PACKAGES PRODUCED THEREFROM

(71) Applicant: AMCOR FLEXIBLES WINTERBOURNE LIMITED, Stoke Gifford (GB)

(72) Inventors: David Thomas Stell, Coalpit Heath (GB); Robert James Massey, Coalpit Heath (GB)

(73) Assignee: AMCOR FLEXIBLES WINTERBOURNE LIMITED, Stoke Gifford (GB)

(*) Notice: Subject to any disclaimer, the term of this patent is extended or adjusted under 35 U.S.C. 154(b) by 0 days.

(21) Appl. No.: 16/469,843

(22) PCT Filed: Dec. 11, 2017

(86) PCT No.: PCT/EP2017/082146
§ 371 (c)(1),
(2) Date: Jun. 14, 2019

(87) PCT Pub. No.: WO2018/108776
PCT Pub. Date: Jun. 21, 2018

(65) Prior Publication Data
US 2019/0366694 A1    Dec. 5, 2019

(30) Foreign Application Priority Data
Dec. 16, 2016 (EP) .................................... 16204810

(51) Int. Cl.
*B32B 27/08* (2006.01)
*B32B 7/06* (2019.01)
(Continued)

(52) U.S. Cl.
CPC ................ *B32B 27/08* (2013.01); *B32B 7/06* (2013.01); *B32B 27/10* (2013.01); *B32B 27/12* (2013.01);
(Continued)

(58) Field of Classification Search
CPC ....... B32B 2439/40; B32B 27/08; B32B 7/06; B32B 27/10; B32B 27/12; B32B 27/16;
(Continued)

(56) References Cited

U.S. PATENT DOCUMENTS 5,028,480 A * 7/1991 Dean ..................... B32B 27/08
428/317.9
5,773,136 A * 6/1998 Alder ..................... B32B 7/02
428/317.3
(Continued)

FOREIGN PATENT DOCUMENTS

CN    1470589 A    1/2004
CN    1552608 A    12/2004
(Continued)

OTHER PUBLICATIONS

ExxonMobil LDPE LD 185BW Low Density Polyethylene Resin found online on the MatWeb Material Property Data website and archived online at https://web.archive.org/web/20150928190454/https://www.matweb.com/search/datasheettext.aspx?matguid=851dc2978df6414aaf8cc7504686dd73 (Year: 2015).*
(Continued)

*Primary Examiner* — Lee E Sanderson (57) ABSTRACT

A heat-sealable multilayer film may include a support layer, a polyethylene heat-seal layer, and an intermediate peelable layer. The support layer may include at least one polymeric layer. Heat-sealed packages comprising the multilayer film described herein have peelable seals characterized by an appropriate peel strength substantially independent of the
(Continued)

seal conditions and substantially free of stringing upon peeling.

17 Claims, 1 Drawing Sheet

(51) Int. Cl.
| | |
|---|---|
| *B32B 27/10* | (2006.01) |
| *B32B 27/12* | (2006.01) |
| *B32B 27/16* | (2006.01) |
| *B32B 27/32* | (2006.01) |
| *B32B 27/34* | (2006.01) |
| *B32B 27/30* | (2006.01) |
| *B32B 27/36* | (2006.01) |
| *B32B 37/06* | (2006.01) |

(52) U.S. Cl.
CPC .............. *B32B 27/16* (2013.01); *B32B 27/32* (2013.01); *B32B 27/34* (2013.01); *B32B 27/30* (2013.01); *B32B 27/36* (2013.01); *B32B 37/06* (2013.01); *B32B 2250/24* (2013.01); *B32B 2307/31* (2013.01); *B32B 2439/40* (2013.01)

(58) Field of Classification Search
CPC ..... B32B 27/32; B32B 27/34; B32B 2250/24; B32B 2307/31; B32B 2323/04; B32B 15/08
See application file for complete search history.

(56) References Cited

U.S. PATENT DOCUMENTS

| | | | |
|---|---|---|---|
| 6,245,176 B1 | 6/2001 | Greenland | |
| 2008/0045663 A1* | 2/2008 | Kolb | C08F 210/16 525/240 |
| 2010/0279133 A1* | 11/2010 | Kamikage | B32B 27/36 428/483 |
| 2012/0021220 A1* | 1/2012 | Ishida | C08J 3/126 525/240 |
| 2012/0169083 A1* | 7/2012 | Matsumoto | B60J 5/04 296/146.7 |
| 2014/0186589 A1 | 7/2014 | Chang | |
| 2015/0210461 A1* | 7/2015 | Morris | B32B 7/00 426/127 |
| 2017/0367977 A1* | 12/2017 | Suzuki | A61K 47/22 |

FOREIGN PATENT DOCUMENTS

| | | |
|---|---|---|
| CN | 201932498 U | 8/2011 |
| CN | 202337038 U | 7/2012 |
| CN | 103153811 A | 6/2013 |
| CN | 104097379 A | 10/2014 |
| CN | 104228245 A | 12/2014 |
| CN | 105492337 A | 4/2016 |
| EP | 0258527 A | 3/1988 |
| EP | 0746468 B1 | 12/1996 |
| EP | 221638 A2 | 8/2010 |
| EP | 2216368 A2 | 8/2010 |
| JP | 6362370 A | 3/1988 |
| JP | H11245356 A | 9/1999 |
| JP | 200079663 A | 3/2000 |
| JP | 2000168003 A | 6/2000 |
| JP | 2000168003 A * | 6/2000 |
| JP | 2001524038 A | 11/2001 |
| JP | 2012116061 A * | 6/2012 |
| JP | 2012116061 A | 6/2012 |
| JP | 2015047842 A | 3/2015 |
| JP | 6101515 B2 | 3/2017 |
| WO | 1996020085 A1 | 7/1996 |

OTHER PUBLICATIONS

ExxonMobil LDPE LD 185BW Low Density Polyethylene Resin available online at https://www.matweb.com/search/datasheet.aspx?matguid=851dc2978df6414aaf8cc7504686dd73 (accessed Jun. 22, 2023) (Year: 2023).*

* cited by examiner

POLYMERIC FILMS AND PACKAGES PRODUCED THEREFROM

FIELD

This disclosure concerns multilayer films that are capable of being heat-sealed to substrates to provide peelable seals between the films and the substrates.

INTRODUCTION

Peelable seals between polymeric films and a variety of surfaces are well known in the packaging art, for example for the packaging of foodstuffs and medical equipment and are for example disclosed in U.S. Pat. No. 6,245,176 B1; EP 0 258 527 A1 and EP 0 746 468 A1. The ability to peel such seals generally facilitates the opening of sealed packages and in addition, such seals often provide evidence of tampering once they have been peeled.

The mechanism by which such seals can be peeled and the force required to do so, will usually depend on the materials involved in forming the heat seal. However, peeling will either involve separation of the boundary between different materials in the seal area or the internal rupture of a polymeric layer through the seal area.

In general, the ability of the seal to peel depends on both the composition of the heat-seal layer of the film and the material which forms the surface to which it is heat-sealed. Thus, the incompatibility at the interface between the film and the surface to which it is sealed can range from high, with the result that unacceptably low seal strengths result, to low, with the resulting heat seals being so strong that they will not peel before tearing of the film occurs.

While peeling at the heat-seal layer/article interface may be possible by the suitable choice of polymers for the heat-seal layer and the article to which it is to be heat-sealed, such an approach becomes impossible when dealing with articles made of other materials, for example fibrous materials such as uncoated paper, and other fibrous non-woven materials, such as the material sold by DuPont under the trade mark "Tyvek". This is a serious deficiency because paper and Tyvek® are widely used as a packaging material for medical equipment.

Heat-sealable films that peel by failure at an inter-ply boundary within their structures can be used to form peelable seals with a wide variety of materials, for example paper and thermoplastic polymers, since the strength of the heat seal does not determine peelability. Because peeling of the seal occurs within the thickness of the heat-sealable film by (1) breaking through the seal layer at the beginning of the peel, then (2) delamination in the region of the heat seal, and (3) breaking through the seal layer at the end of the peel, part of the film necessarily remains adhered to the surface to which it has been heat-sealed, resulting in strings of polymer hanging from the edges of the heat-seal zone.

As an alternative to peeling at layer boundaries, it has also been proposed to form peelable heat seals by the use of heat-sealable films that include at least one outer layer having a relatively low internal cohesive strength. Peeling then takes place by rupturing this layer within its thickness, with the result that when the heat-seal area is opened, part of this layer remains on the peeled film and part also remains on the surface to which the film has been heat-sealed. Peeling of such films is in general dependent on the nature of the surface to which the film is heat-sealed. Stringing and consequential possible contamination can be a problem with such films, since peeling within the layer having a low internal cohesive strength rather than rupture to the outside of the film tends to continue outside the heat-seal zone.

Examples of layers that can be used to produce seals which peel by rupture within their thickness, include blends of thermoplastic polymers with incompatible fillers. Such fillers can be inorganic particulates or incompatible polymers. As will be appreciated, for such layers to rupture internally rather than merely tear, they will need to have bond strengths to adjacent layers that are stronger than the internal cohesive strength of the layer itself.

In order to reduce stringing upon peeling, EP 0 971 819 A1 discloses a heat-sealable polymeric film comprising an outer, polymeric heat-seal layer having a viscosity at its heat-sealing temperatures such that it will flow into and penetrate the fibrous structure of a fibrous material at such temperatures, an intermediate polymeric layer in contact with the heat-seal layer, the intermediate polymeric layer being capable of cohesively splitting when the heat-sealed film is peeled, and at least one further polymeric layer, the heat-seal layer being easier to fracture than the intermediate layer at the temperature at which peeling is to occur, the peeling continuing through the intermediate layer.

The appropriate viscosity of the heat-seal layer at its heat-sealing temperature and its tendency to rupturing at the temperature of peeling is obtained from a blend containing 70 to 95% by weight of polyethylene or ethylene/propylene copolymer and 5 to 30% by weight of an additive comprising poly-di-pentene or a polyterpene, an alpha-methyl styrene resin, a vinyltoluene/alpha-methyl styrene resin or a modified aromatic resin.

The intermediate layer, in order to have a facilitated splitting within the layer when the heat-sealed film is peeled, comprises a blend of 35 to 85% by weight of polyethylene or ethylene/propylene copolymer and 15 to 65% by weight of talc, wherein polyethylene or ethylene/propylene copolymer may be partially replaced by an incompatible polymer.

Although correct peel strengths without significant stringing is observed, the presence of low molecular weight hydrocarbon resins in the seal layer, for adjusting viscosity and effectuating embrittlement, creates unpleasant fumes, not only during the processing of the heat-sealable film but also upon heat sealing.

EP 0 746 468 discloses a multilayer polymeric film comprising a base layer of a polypropylene polymer, a non-voided intermediate layer on the base layer, and a heat sealable polymer layer on the intermediate layer, the non-voided intermediate layer having an internal cohesive strength less than the bond strength of the intermediate layer to either the base layer or the heat sealable layer and less than the internal cohesive strength of either the base layer or the heat sealable layer.

The intermediate layer comprises a blend of a propylene polymer and an ethylene polymer; the heat sealable polymer layer can be selected from olefin copolymers, more particularly copolymers containing units derived from at least two ethylene, propylene and butane-1, preferably propylene/ethylene copolymers and/or propylene/ethylene/butane1 terpolymers. The seal layer of all examples has a propylene/ethylene copolymer containing 4% by weight of ethylene.

EP 2 216 368 discloses a resin composition for a sealant comprising:

an ethylene polymer having a density (ASTM D 1505) of 0.900 to 0.960 g/m³ and a melt flow rate (ASTM D1238, 190° C.; load of 2.16) of 0.1 to 70 g/10 min., in an amount of 10 to 70% by weight;

a propylene polymer in an amount of 10 to 80% by weight;

a butene polymer in an amount of 10 to 70% by weight.

A sealant layer comprising the above resin composition allows for high sealing properties and easy peel properties. For a heat sealable multilayer film wherein the adhesion strength between the support and the seal layer is not sufficient an intermediate adhesive layer may be used.

Neither EP 0 746 468 nor EP 2 216 368, deal with the rupturing tendency of the seal layer upon peeling or with the seal layer polymer characteristics to be fulfilled for getting rupturing of said seal layer within its thickness.

Without contesting the associated advantages of the above-mentioned state of the art systems, shortcomings are still present and improvements are desirable.

AIMS

The present disclosure aims to provide heat-sealable multilayer films for the production of heat-sealable packages, having peelable seals characterized by an appropriate peel strength that is substantially independent of the seal conditions and substantially free of stringing upon peeling said heat-sealed film, said heat-sealable multilayer film being produced and sealed without a substantial development of fumes, the heat-sealable multilayer film being further characterized in that the seal layer and the peelable intermediate layer both have a minimum thickness.

SUMMARY

The present disclosure describes a heat-sealable multilayer film (A) comprising:
a) a support layer comprising at least one polymeric layer;
b) a polyethylene heat-seal layer, the polyethylene being characterized by a melt flow index, measured according to ASTM D1238 at 190° C. with a load of 2.16 kg, comprised between 2 and 110 g/10 min., preferably between 8 and 100 g/10 min., more preferably comprised between 20 and 80 g/10 min., most preferably between 30 and 70 g/10 min.; and
c) an intermediate peelable layer contacting the support layer (a) and the heat-seal layer (b), said intermediate layer (c) comprising from 50 to 95% by weight, preferably from 70 to 90% by weight of polyethylene and from 5 to 50% by weight, preferably from 10 to 30% by weight of one or more substances selected from the group consisting of polypropylene, polybutylene, polystyrene (PS), polyethylene terephthalate glycol copolymers (PETG), styrene butadiene styrene copolymers (SBS), cyclic olefin copolymers (COC), polymethyl methacrylate (PMMA), styrene methyl methacrylate, acrylonitrile butadiene styrene (ABS) and talc, said intermediate layer (c) having an internal cohesive strength that is less than the bond strength of said intermediate layer (c) to either the support layer (a) or the heat-sealable layer (b) and less than the internal cohesive strength of either the support layer (a) or the heat-sealable layer (b);

wherein:
the support layer (a) represents from 70 to 94% by weight, preferably from 80 to 90% by weight of the multilayer film;
the polyethylene heat-seal layer (b) represents from 3 to 15% by weight, preferably from 5 to 10% by weight of the multilayer film;
the intermediate layer (c) represents from 3 to 15% by weight, preferably from 5 to 10% by weight of the multilayer film;
the total weight percentage of (a), (b), (c) being 100.

Preferred embodiments of the present disclosure disclose one or more of the following features:
the at least one polymer of the support layer (a) is selected from the group consisting of polyamide, polyester, polycarbonate, polyvinyl chloride, polypropylene, low-density polyethylene, high-density polyethylene, polyester-glycol copolymer, ethylene vinyl acetate, ethylene acrylate ionomer, ethylene acrylate terpolymer and styrene-butadiene copolymer.
the support layer (a) is a multilayer comprising:
a layer of polypropylene and a layer of polyethylene terephthalate; or
a layer of low-density polyethylene and nylon 6; or
a layer of ethylene vinylacetate copolymer, a layer of ethylene acrylate ionomer and a layer of a layer of ethylene vinylacetate copolymer; or
a layer of high-density polyethylene and a layer of low-density polyethylene; or
a layer of polyethylene terephthalate and a layer of low-density polyethylene;
the polyethylene heat-seal layer (b) is a low-density polyethylene heat-seal layer;
the polyethylene heat-seal layer (b) is substantially free of additives which embrittle the layer;
polyethylene of the intermediate layer (c) comprises at least 80% by weight, preferably at least 90% by weight, more preferably at least 95% by weight, most preferably at least 99% of polymerized ethylene;
polypropylene or polybutylene of the intermediate layer (c) comprises a copolymerized ethylene content of not more than 5% by weight, preferably of not more than 3% by weight, more preferably of not more than 2% by weight, most preferably of not more than 1% by weight;
the thickness of the intermediate peelable layer (c) is comprised between 2 and 20 µm, preferably between 4 and 15 µm;
the thickness of the heat-seal layer (b) is comprised between 2 and 20 µm, preferably between 4 and 15 µm;
the polymer used for the heat-seal layer (b) is characterized by an elongation to break in the machine direction, in accordance with ASTM D638, of less than 500%, preferably of less than 200%, more preferably of less than 100%;
the polymer used for the heat-seal layer (b) is characterized by a tensile strength at break in the machine direction, in accordance with ASTM D638-14, of less than 13 MPa, preferably less than 10 MPa, more preferably less than 8 MPa.

The present disclosure further describes a heat-sealed package comprising the heat-sealable multilayer film (A) and a substrate (B) in contact with the heat-seal layer (b), said substrate being selected from the group consisting of an additional polymeric film, coated paper, uncoated paper, paperboard, metallic foil, cellulosic non-woven, polymeric non-woven and woven fabric, wherein the additional polymeric film is selected from the group consisting of polyethylene, polyamide, polyester, polycarbonate, polyvinyl chloride, ethylene vinyl acetate, and high-impact polystyrene, said heat-sealed package being characterized by a peel strength, measured according to ASTM F88, is comprised between 2.0 and 6.0 N/15 mm, preferably between 2.5 and 5.0 N/15 mm, more preferably between 2.5 and 4 N/15 mm, the rupture being internal the intermediate peelable layer (c).

The present disclosure further describes a method for producing the heat-sealed package, comprising contacting the substrate (B) with the heat-seal layer (b) of the heat-sealable multilayer film (A) and sealing at a temperature comprised between 100 and 180° C., preferably between 120 and 160° C. using a dwell time comprised between 0.2 and 3 seconds, preferably between 0.5 and 2 seconds, and a pressure comprised between 100 and 600 kPa, preferably between 150 and 400 kPa, and cooling down the heat-sealed package.

A preferred embodiment of the method for producing the heat-sealed package of the present disclosure includes the additional step of subjecting the heat-seal layer (b) to a plasma treatment, preferably a corona-plasma treatment, before contacting the multilayer film (A) with the substrate (B).

KEY

A. heat-sealable multilayer film
a. support layer
b. polyethylene heat-seal layer
c. intermediate peelable layer
B. substrate
1. heat-sealing bar
2. heat-seal zone
3. seal layer rupture
4. intermediate peelable layer cohesively splitting

DETAILED DESCRIPTION

According to the present disclosure, there is provided a heat-sealable multilayer film comprising a support layer, said support layer comprising at least one polymeric layer, a polyethylene heat-seal layer, the polyethylene being characterized by a melt flow index measured according to ASTM D1238 at 190° C. with a load of 2.16 kg, of at least 2 g/10 min. and an intermediate polymeric layer contacting the support layer and the heat-seal layer, the intermediate polymeric layer being capable of cohesively splitting when the heat-sealed film is peeled, the heat-seal layer being easier to break than the intermediate layer at the temperature at which peeling occurs so that heat-seal layer ruptures whereupon peeling continues through the thickness of the intermediate layer.

The support layer of the heat-sealable multilayer film of the present disclosure comprises at least one polymeric layer, said at least one polymeric layer comprising a polymer selected from the group consisting of polyamide, polyester, polycarbonate, polyvinyl chloride, polypropylene, low-density polyethylene, medium-density polyethylene, high-density polyethylene, polyester-glycol copolymer, ethylene vinyl acetate, ethylene acrylate ionomer, ethylene acrylate terpolymer, and styrene-butadiene copolymer.

Preferably, the support layer is a multilayer, preferably comprising a layer of polypropylene and a layer of polyethylene terephthalate; or a layer of low-density polyethylene and nylon 6; or a layer of ethylene vinylacetate copolymer, a layer of ethylene acrylate ionomer and a layer of a layer of ethylene vinylacetate copolymer; or a layer of high-density polyethylene and a layer of low-density polyethylene; or a layer of polyethylene terephthalate and a layer of low-density polyethylene.

The support layer in general is characterized by an overall thickness comprised between 10 and 600 μm, preferably between 20 and 100 μm.

By polyethylene of the heat-seal layer, the present disclosure means the homopolymers made from the polymerization of ethylene and the copolymers made from the copolymerization of ethylene and one or more ethylenically unsaturated monomers selected from the group consisting of acrylate esters, methacrylate esters, vinyl alkanoates and alpha olefins.

Polyethylene of the heat-seal layer is preferably selected from low-density polyethylene, linear low-density polyethylene, high-density polyethylene, poly(ethylene vinylacetate), poly(ethylene methyl acrylate) and poly(ethylene butyl acrylate), characterized by a melt flow index measured according to ASTM D1238 at 190° C. with a load of 2.16 kg comprised between 2 and 110 g/10 min., preferably between 8 and 100 g/10 min., more preferably between 20 and 80 g/10 min., most preferably between 30 and 70 g/10 min.

Polyethylene of the heat-seal layer is preferably low-density polyethylene.

The heat-seal layer comprises more than 70% by weight, preferably more than 80% by weight, more preferably more than 90% by weight, most preferably more than 95% of polyethylene, preferably low-density polyethylene.

The heat-seal layer of multilayer film of the present disclosure is substantially free of additives which embrittle said layer.

Examples of additives that create embrittlement are poly-di-pentene or a polyterpene, an alpha-methyl styrene resin, a vinyltoluene/alpha-methyl styrene resin, a modified aromatic resin or a hydrogenated hydrocarbon resin.

By substantially free is meant in the present disclosure that the heat-seal layer comprises less than 5% by weight, preferably less than 3% by weight, more preferably less than 1% by weight, most preferably less than 0.5% by weight or even less than 0.1% by weight of additives which embrittle said layer.

Preferably, the heat-seal layer does not comprise additives that embrittle said layer.

The heat-seal layer in general is characterized by a thickness comprised between 2 and 20 μm, preferably between 4 and 15 μm.

The inventors have found that a polyethylene heat-seal layer characterized by a melt flow index measured according to ASTM D1238 at 190° C. with a load of 2.16 kg comprised between 2 and 110 g/10 min., preferably between 8 and 100 g/10 min., allows for good sealing when sealed under appropriate sealing conditions and for sufficient embrittlement, at the peeling temperature, for getting rupturing of said layer within its thickness, upon peeling.

At a thickness of about 10 μm, the polyethylene heat-seal layer is further characterized by an elongation to break in the machine direction, in accordance with ASTM D638 of less than 500%, preferably of less than 200%, more preferably of less than 100%, and a tensile strength at break in the machine direction, in accordance to ASTM D638-14 of less than 13 MPa, preferably less than 10 MPa, more preferably less than 8 MPa.

The intermediate polymeric layer comprises a blend of polyethylene and second polymer which is incompatible with polyethylene, preferably an poly(alpha)olefin which is incompatible with polyethylene, and/or talc.

Preferably, the second polymer is selected from the group consisting of polypropylene, polybutylene, polystyrene (PS), polyethylene terephthalate glycol copolymers (PETG), styrene butadiene styrene copolymers (SBS), cyclic olefin copolymers (COC), polymethyl methacrylate (PMMA), styrene methyl methacrylate, acrylonitrile butadiene styrene (ABS). Preferably, the second polymer is polypropylene or polybutylene, wherein polypropylene preferably is a homopolymer or a copolymer of propylene and ethylene, said copolymer having a copolymerized ethylene content of not more than 5% by weight, preferably of not more than 3% by weight, more preferably of not more than 2% by weight, most preferably of not more than 1% by weight and wherein polybutylene preferably is a homopolymer or a copolymer of butylene, preferably alpha butylene and ethylene, said copolymer having a copolymerized ethylene content of not more than 5% by weight, preferably of not more than 3% by weight, more preferably of not more than 2% by weight, most preferably of not more than 1% by weight.

Polyethylene of the intermediate layer preferably comprises at least 80% by weight, more preferably at least 90% by weight, most preferably at least 95%, or even at least 99% by weight of polymerized ethylene, the remaining weight percentage comprising copolymerized C4 to C8 alpha olefin.

The intermediate layer comprises from 50 to 95% by weight, preferably from 70 to 90% by weight of polyethylene and 5 to 50% by weight, preferably from 10 to 30% by weight of a substance selected from the group consisting of polypropylene, polybutylene, polystyrene (PS), polyethylene terephthalate glycol copolymers (PETG), styrene butadiene styrene copolymers (SBS), cyclic olefin copolymers (COC), polymethyl methacrylate (PMMA), styrene methyl methacrylate, acrylonitrile butadiene styrene (ABS) and talc.

The intermediate layer in general is characterized by a thickness comprised between 2 and 20 µm, preferably between 4 and 15 µm.

A blend of polyethylene and polypropylene and/or polybutylene as intermediate layer allows for a decreased thickness of the heat-seal layer with a uniform flat surface of said seal layer.

Multilayer films in accordance with the present disclosure can be produced by known methods. However, it is generally preferred to produce them by coextruding melts of the polymers and additives required for the various layers of the final films, followed by cooling to solidify the polymers in the form of a film. In general, films of the present disclosure will not be oriented but they can be if desired mono- or bi-axially oriented for example using known methods. Another method is to laminate a film of the present disclosure, for example a four-layer film having an outer layer of high-density polyethylene, an intermediate layer of low-density polyethylene, an intermediate peelable layer, and an outer heat-sealable layer, to another film, for example of a polyamide (nylon), a polycarbonate, a polyester, polyvinyl chloride, or a polyester-glycol copolymer, or to a foil.

Films in accordance with the present disclosure can also be produced by coextrusion coating of the heat-seal layer and the intermediate peelable layer onto a suitable support layer or by coextrusion coating of the heat-seal layer, the intermediate peelable layer and a polyethylene layer on to a suitable support layer.

The heat-sealable multilayer film of the present disclosure may be used for the production of peelable heat-sealed packages through heat sealing said multilayer film to a substrate which may be an additional polymer, a multilayer film, a metallic foil, a coated paper or a fibrous substrate such as uncoated paper, paperboard, cellulosic non-woven, polymeric non-woven such as the material sold by DuPont under the trade mark "Tyvek" and woven fabric.

Heat sealing the multilayer film of the present disclosure to a substrate is performed at a temperature comprised between 100 and 180° C., preferably between 120 and 160° C. using a dwell time comprised between 0.2 and 3 seconds, preferably between 0.5 and 2 seconds and a pressure comprised between 100 and 600 kPa, preferably between 150 and 400 kPa.

For the particular case where the multilayer film of the present disclosure is heat-sealed to an additional polymer or multilayer film, it is preferred that said additional polymer or multilayer film comprises an outer polyethylene heat-seal layer, said outer polyethylene heat-seal layer contacting the polyethylene heat-seal layer of the multilayer film of the present disclosure upon heat sealing.

The melt flow index of the polyethylene of the heat-seal layer of the multilayer film of the present disclosure should be such that at the temperatures used to form the heat seals, for example 110 to 180° C., sufficient mechanical interlocking and a chemical anchoring between the heat-seal layer and the substrate are guaranteed.

The polyethylene heat-seal layer of the multilayer film of the present disclosure preferably is subjected a plasma treatment, more preferably a corona-plasma treatment at a frequency power in the range of 10 to 30 kHz before contacting and heat sealing to the substrate.

Multilayer films in accordance with the present disclosure have shown good evidence, by scanning electron microscopy, of peeling through the intermediate layer (cohesively splitting within the thickness of the intermediate layer) after rupturing the seal layer via the shortest path.

Peelable packages produced from the multilayer films of the present disclosure and the above substrates have shown substantially constant peel strengths, measured according to ASTM F88, of less than 10 N/15 mm, irrespective of heat-seal temperature as a result of the peel strength primarily depending on the mechanical properties of the intermediate layer and not the strength of the heat seal.

The peel strength, measured according to ASTM F88, preferably is comprised between 1.0 and 8.0 N/15 mm, more preferably between 2.0 and 6.0 N/15 mm, most preferably between 2.5 and 5 N/15 mm. and preferably is less than the bond strength of the heat-seal layer to the substrate.

For the particular case of the multilayer film heat-sealed to a fibrous substrate, it is particularly preferred that the force per unit area required to perform peeling of the multilayer film is less than the force per unit area required to remove fibers from a fibrous material when the film has been heat-sealed to such a material.

Figure 1:
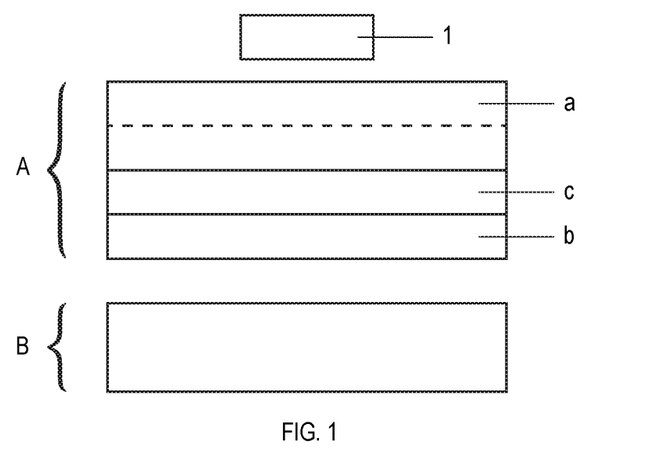
FIG. 1 shows a section through a film in accordance with the present disclosure that is about to be heat-sealed to a substrate.

FIG. 1 shows a film in accordance with the present disclosure (A) before being heat-sealed to a substrate (B) using a heat-sealing bar 1, the film (A) having a heat-seal layer (b), an intermediate peelable layer (c), and a support layer (a).

Figure 2:
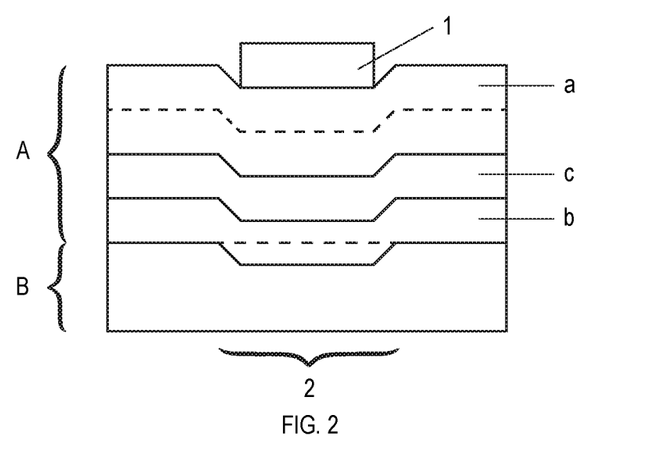
FIG. 2 shows a section through the film of FIG. 1 that is heat-sealed to a substrate.

The film (A) is then heat-sealed to the substrate (B) to form a heat-seal zone 2 as shown in FIG. 2. As can be seen, the heat-seal layer (b) has partially penetrated into the substrate as shown at the heat-seal zone 2, the substrate (B) now close to being in contact with the intermediate peelable layer (c). Outside the heat-seal zone 2, the substrate (B) is in contact with the heat-seal layer (b) but is not adhered to it.

Figure 3:
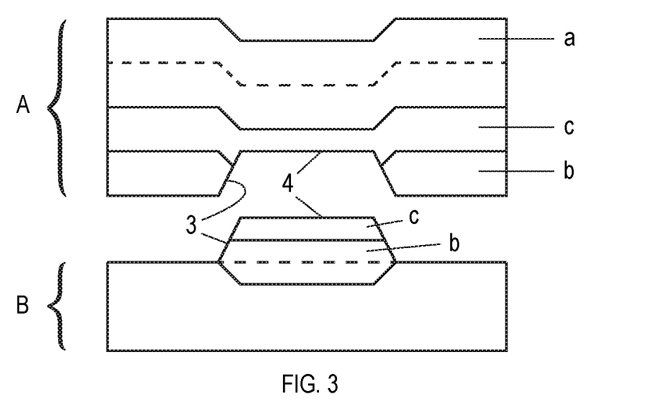
FIG. 3 shows the heat seal of FIG. 2 after it has been peeled.

The film (A) is then peeled to produce a peeled seal as shown in FIG. 3, the brittle seal layer rupturing through via the shortest path 3 to the intermediate peelable layer and the intermediate peelable layer having cohesively split 4 within its thickness leaving some of it on the substrate (B) in the heat-seal zone 2, whilst some of it remains on the film (A) in this zone.

The brittle nature of the heat-seal layer (b) causes it to cleanly fracture on both sides of the heat-seal zone 2, thereby avoiding stringing.

EXAMPLES

The following illustrative examples are merely meant to exemplify the present disclosure but are not destined to limit or otherwise define the scope of the present disclosure.

Example 1

A five-layer polymeric film 75 μm thick was cast by coextruding melts (cast co-extrusion temperature: 260° C.; cast co-extrusion line speed: 20-30 m/min.) of the appropriate films through a slot die. The film had a first layer 25 μm thick consisting of nylon 6 polyamide, a second layer consisting of linear low-density polyethylene grafted with maleic anhydride, a third layer 35 μm thick of polyethylene, adhered to the polyamide layer by a 5 μm-thick tie, a fourth layer 5 μm thick consisting of a blend of 75% by weight of low-density polyethylene and 25% by weight of polybutylene and a fifth layer consisting of linear low-density polyethylene characterized by a melt flow index measured according to ASTM D1238 at 190° C. with a load of 2.16 kg of 70 g/10 min. The film was cooled and then wound up.

Thereafter, samples of this film were heat-sealed to a sheet of Tyvek® 2FS (DuPont) using a sealing bar, applied to the Tyvek® as top web, at a temperature of 120° C. and 130° C., respectively using a dwell time of 1 sec. and a pressure of 200 kPa.

The resulting heat seals were allowed to cool and they were then peeled by pulling the Tyvek® 2FS sheet from the film. In each case, peeling occurred by fracture through the fifth layer and then by cohesive splitting within the fourth layer of the five layer film. Immediately after the heat-seal region the peel broke out through the fifth layer to give a clean peel without stringing.

The peel strengths of the seals formed at 120° C. and 130° C. were 3.0 N/15 mm and 3.1 N/15 mm, respectively, as measured according to ASTM F88 using a constant 90° peel test with 50 mm length samples, conducted at 500 mm/min on a Lloyd LRX mechanical testing machine.

Example 2

The film of Example 1, yet with a fourth layer blend composition (weight percentage) as in column 1 of Table 1 and a fifth layer polyethylene melt flow index as in column 2 of Table 1 was heat-sealed to a sheet of Tyvek® 2FS (DuPont) using a sealing bar, applied to the film as top web, at a temperature as in column 3 of Table 1, using a dwell time of 1 sec. and a pressure of 200 kPa. Peel strengths as in column 4 of Table 1 were measured according to the method as in Example 1.

TABLE 1

| Polyethylene/polybutylene | MFI (g/10 min.) | Seal temp. (° C.) | Peel strength (N/15 mm) |
|---|---|---|---|
| 65/35 | 35 | 110 | 2.8 |
|  |  | 160 | 3.0 |
|  | 95 | 110 | 3.1 |
|  |  | 160 | 2.8 |
| 90/10 | 35 | 110 | 2.9 |
|  |  | 160 | 3.2 |
|  | 95 | 110 | 3.2 |
|  |  | 160 | 3.0 |

In each case, peeling occurred by fracture through the fifth layer and then by cohesive splitting within the fourth layer. Immediately after the heat-seal region the peel broke out through the fifth layer to give a clean peel without stringing.

Example 3

A five-layer polymer film 85 μm thick was cast by coextruding melts (cast co-extrusion temperature: 260° C.; cast co-extrusion line speed: 20-30 m/min.). The film had a first layer 30 μm thick consisting of nylon 6, a second layer consisting of a maleic anhydride grafted polyethylene, a third layer 30 μm thick of low-density polyethylene, adhered to the nylon 6 layer by a 5 μm thick tie; a fourth layer 10 μm thick consisting of a blend of 80% by weight of low-density polyethylene and 20% by weight of polypropylene and a fifth layer 10 μm thick consisting of linear low-density polyethylene characterized by a melt flow index measured according to ASTM D1238 at 190° C. with a load of 2.16 kg of 80 g/10 min. The film was cooled and then wound up.

Thereafter, a sheet of this film was corona-treated (25 kHz) at its fifth layer side and subsequently heat-sealed to an uncoated paper using a sealing bar applied to the paper, at a temperature of 140° C. using a dwell time of 1 sec. and a pressure of 500 kPa.

The resulting heat seal was allowed to cool and was then peeled by pulling the paper from the film. Peeling took place by fracture through the fifth layer and then by cohesive splitting within the fourth layer. Immediately after, the heat-seal region the peel broke out through the fifth layer to give a clean peel without stringing. A peel strength of 3.1 N/15 mm was measured.

Example 4

A four layer polymer film 60 μm thick was cast by coextruding melts (cast co-extrusion temperature: 260° C.; cast co-extrusion line speed: 20-30 m/min.). The film had a first layer 30 μm thick consisting of nylon 6 polyamide, a second layer consisting of linear low-density polyethylene grafted with maleic anhydride, a third layer 20 μm thick of low-density polyethylene, adhered to the polyamide layer by a 5 μm thick tie; a fourth layer 10 μm thick of linear low-density polyethylene characterized by a melt flow index measured according to ASTM D1238 at 190° C. with a load of 2.16 kg of 8 g/10 min. The film was cooled and then wound up.

Example 5

A sheet of the five layer film of Example 1 was contacted with a sheet of the four layer film of Example 4, wherein the fifth layer (polyethylene layer MFI: 70 g/10 min.) of the film of Example 1 was contacted with the fourth layer (polyethylene layer MFI: 8 g/10 min.) of the film of example 4. Subsequently, the samples were heat-sealed using a sealing bar applied to the film at a temperature of 120° C. using a dwell time of 1 sec. and a pressure of 300 kPa.

The resulting heat seal was allowed to cool and was then peeled by pulling the film of Example 1 from the film of Example 4. Peeling took place by fracture through the fifth layer of the five layer film of Example 1 and then by cohesive splitting within the fourth layer of the five layer film of Example 1. Immediately after, the heat-seal region the peel broke out through the fifth layer of the five layer film of Example 1 to give a clean peel without stringing. A peel strength of 2.9 N/15 mm was measured.

The following series of paragraphs is presented without limitation to describe additional aspects and features of the disclosure:

E0. A heat-sealable multilayer film (A) comprising:
  a) a support layer comprising at least one polymeric layer;
  b) a polyethylene heat-seal layer, the polyethylene being characterized by a melt flow index, measured according to ASTM D1238 at 190° C. with a load of 2.16 kg, comprised between 2 and 110 g/10 min., preferably between 8 and 100 g/10 min., more preferably between 20 and 80 g/10 min., most preferably between 30 and 70 g/10 min.; and
  c) an intermediate peelable layer contacting the support layer (a) and the heat-seal layer (b) said intermediate layer (c) comprising from 50 to 95% by weight, preferably from 70 to 90% by weight of polyethylene and from 5 to 50% by weight, preferably from 10 to 30% by weight of one or more substances selected from the group consisting of polypropylene, polybutylene, polystyrene (PS), polyethylene terephthalate glycol copolymers (PETG), styrene butadiene styrene copolymers (SBS), cyclic olefin copolymers (COC), polymethyl methacrylate (PMMA), styrene methyl methacrylate, acrylonitrile butadiene styrene (ABS), and talc, said intermediate layer (c) having an internal cohesive strength less than the bond strength of said intermediate layer (c) to either the support layer (a) or the heat-sealable layer (b) and less than the internal cohesive strength of either the support layer (a) or the heat-sealable layer (b);
wherein:
  the support layer (a) represents from 70 to 94% by weight, preferably from 80 to 90% by weight of the multilayer film;
  the polyethylene heat-seal layer (b) represents from 3 to 15% by weight, preferably from 5 to 10% by weight of the multilayer film;
  the intermediate layer (c) represents from 3 to 15% by weight, preferably from 5 to 10% by weight of the multilayer film;
the total weight percentage of (a), (b), (c) being 100.

E1. The heat-sealable multilayer film (A) according to E0 wherein the at least one polymer of the support layer (a) is selected from the group consisting of polyamide, polyester, polycarbonate, polyvinyl chloride, polypropylene, low-density polyethylene, high-density polyethylene, polyester-glycol copolymer, ethylene vinyl acetate, ethylene acrylate ionomer, ethylene acrylate terpolymer, and styrene-butadiene copolymer.

E2. The heat-sealable multilayer film (A) according to E0 or E1 wherein the support layer (a) is a multilayer comprising:
  a layer of polypropylene and a layer of polyethylene terephthalate; or
  a layer of low-density polyethylene and nylon 6; or
  a layer of ethylene vinylacetate copolymer, a layer of ethylene acrylate ionomer and a layer of a layer of ethylene vinylacetate copolymer; or
  a layer of high-density polyethylene and a layer of low-density polyethylene; or
  a layer of polyethylene terephthalate and a layer of low-density polyethylene.

E3. The heat-sealable multilayer film (A) according to any of paragraphs E0 through E2, wherein the polyethylene heat-seal layer (b) is a low-density polyethylene heat-seal layer.

E4. The heat-sealable multilayer film (A) according to any of any of paragraphs E0 through E3, wherein the polyethylene heat-seal layer (b) is substantially free of additives which embrittle the layer.

E5. The heat-sealable multilayer film (A) according to any of any of paragraphs E0 through E4, wherein:
polyethylene of the intermediate layer (c), comprises at least 80% by weight, preferably at least 90% by weight, more preferably at least 95% by weight, most preferably at least 99% of polymerized ethylene; and
polypropylene or polybutylene of the intermediate layer (c), comprises a copolymerized ethylene content of not more than 5% by weight, preferably of not more than 3% by weight, more preferably of not more than 2% by weight, most preferably of not more than 1% by weight.

E6. The heat-sealable multilayer film (A) according to any of any of paragraphs E0 through E5, wherein the thickness of the intermediate peelable layer (c) is comprised between 2 and 20 µm, preferably between 4 and 15 µm.

E7. The heat-sealable multilayer film (A) according to any of any of paragraphs E0 through E6, wherein the thickness of the heat-seal layer (b) is comprised between 2 and 20 µm, preferably between 4 and 15 µm.

E8. The heat-sealable multilayer film (A) according to any of any of paragraphs E0 through E7, wherein the polymer used for the heat-seal layer (b) is characterized by an elongation to break in the machine direction, in accordance with ASTM D638, of less than 500%, preferably of less than 200%, more preferably of less than 100%.

E9. The heat-sealable multilayer film (A) according to any of any of paragraphs E0 through E8, wherein the polymer used for the heat-seal layer (b) is characterized by a tensile strength at break in the machine direction, in accordance with ASTM D638-14, of less than 13 MPa, preferably less than 10 MPa, more preferably less than 8 MPa.

F0. A heat-sealed package comprising the heat-sealable multilayer film (A) according to any of paragraphs E0 through E9, and a substrate (B), in contact with the heat-seal layer (b), said substrate being selected from the group consisting of an additional polymeric film, coated paper, uncoated paper, paperboard, metallic foil, cellulosic non-woven, polymeric non-woven and woven fabric.

F1. The heat-sealed package according to F0, wherein the substrate (B) is an additional polymeric film selected from the group consisting of polyethylene, polyamide, polyester, polycarbonate, polyvinyl chloride, ethylene vinyl acetate, and high-impact polystyrene.

F2. The heat-sealed package according to F0 or F1, wherein the peel strength, measured according to ASTM F88, is comprised between 2.0 and 6.0 N/15 mm, preferably between 2.5 and 5.0 N/15 mm, more preferably between 2.5 and 4 N/15 mm, the rupture being internal the intermediate peelable layer (c).

G0. Method for producing the heat-sealed package according to any of paragraphs F0 through F2, comprising contacting the substrate (B) with the heat-seal layer (b) of the heat-sealable multilayer film (A) of any one of claims E0 through E9, and sealing at a temperature comprised between 100 and 180° C., preferably between 120 and 160° C. using a dwell time comprised between 0.2 and 3 seconds, preferably between 0.5 and 2 seconds and a pressure comprised between 100 and 600 kPa, preferably between 150 and 400 kPa., and cooling down the heat-sealed package.

G1. The method according to G0, comprising the additional step of subjecting the heat-seal layer (b) to a plasma treatment, preferably a corona-plasma treatment, before contacting with the substrate.

The invention claimed is:

1. A heat-sealable multilayer film comprising:
   a) a support layer comprising at least one polymeric layer, the at least one polymeric layer comprising a polymer selected from the group consisting of polyamide, polyester, polycarbonate, polyvinyl chloride, low-density polyethylene, high-density polyethylene, polyester-glycol copolymer, ethylene vinyl acetate, ethylene acrylate ionomer, ethylene acrylate terpolymer, and styrene-butadiene copolymer;
   b) a polyethylene heat-seal layer comprising more than 70% by weight low-density polyethylene, the polyethylene having a melt flow index, measured according to ASTM D1238 at 190° C. with a load of 2.16 kg, between 2 and 110 g/10 min., and a tensile strength at break in the machine direction, in accordance with ASTM D638-14, of less than 13 MPa; and
   c) an intermediate peelable layer contacting the support layer and the heat-seal layer, the intermediate layer comprising from 75 to 95% by weight of polyethylene and from 5 to 25% by weight of one or more substances selected from the group consisting of polypropylene, polybutylene, polystyrene (PS), polyethylene terephthalate glycol copolymers (PETG), styrene butadiene styrene copolymers (SBS), cyclic olefin copolymers (COC), polymethyl methacrylate (PMMA), styrene methyl methacrylate, acrylonitrile butadiene styrene (ABS), and talc, the intermediate layer having an internal cohesive strength less than a bond strength of the intermediate layer to either the support layer or the heat-sealable layer and less than the internal cohesive strength of either the support layer or the heat-sealable layer;
   wherein:
      the support layer represents from 70 to 94% by weight of the multilayer film;
      the polyethylene heat-seal layer represents from 3 to 15% by weight, of the multilayer film; and
      the intermediate layer represents from 3 to 15% by weight of the multilayer film;
   a total weight percentage of the support layer, the heat-seal layer, and the intermediate layer being 100.

2. The heat-sealable multilayer film according to claim 1, wherein the support layer is a multilayer comprising:
   a layer of low-density polyethylene and nylon 6; or
   a layer of ethylene vinylacetate copolymer, a layer of ethylene acrylate ionomer, and a layer of ethylene vinylacetate copolymer; or
   a layer of high-density polyethylene and a layer of low-density polyethylene; or
   a layer of polyethylene terephthalate and a layer of low-density polyethylene.

3. The heat-sealable multilayer film according to claim 1, wherein the polyethylene heat-seal layer is substantially free of additives which embrittle the layer.

4. The heat-sealable multilayer film according to claim 1, wherein:
   polyethylene of the intermediate layer, comprises at least 80% by weight of polymerized ethylene; and
   polypropylene or polybutylene of the intermediate layer, comprises a copolymerized ethylene content of not more than 5% by weight.

5. The heat-sealable multilayer film according to claim 1, wherein a thickness of the intermediate peelable layer is between 2 and 20 μm.

6. The heat-sealable multilayer film according to claim 1, wherein a thickness of the heat-seal layer is between 2 and 20 μm.

7. The heat-sealable multilayer film according to claim 1, wherein the polymer used for the heat-seal layer has an elongation to break in the machine direction, in accordance with ASTM D638, of less than 500%.

8. The heat-sealable multilayer film of claim 1, wherein the melt flow index is between 8 and 100 g/10 min.

9. The heat-sealable multilayer film of claim 1, wherein the support layer represents from 80 to 90% by weight of the multilayer film.

10. The heat-sealable multilayer film of claim 1, wherein the polyethylene heat-seal layer and the intermediate layer each represents a respective 5 to 10% by weight of the multilayer film.

11. A heat-sealable multilayer film comprising:
   a) a support layer comprising at least one polymeric layer, the at least one polymeric layer comprising a polymer selected from the group consisting of polycarbonate, polyvinyl chloride, low-density polyethylene, high-density polyethylene, polyester-glycol copolymer, ethylene vinyl acetate, ethylene acrylate ionomer, ethylene acrylate terpolymer, and styrene-butadiene copolymer;
   b) a polyethylene heat-seal layer, the polyethylene having a melt flow index, measured according to ASTM D1238 at 190° C. with a load of 2.16 kg, between 2 and 110 g/10 min., and a tensile strength at break in the machine direction, in accordance with ASTM D638-14, of less than 13 MPa; and
   c) an intermediate peelable layer contacting the support layer and the heat-seal layer, the intermediate layer comprising from 50 to 95% by weight of polyethylene and from 5 to 50% by weight of one or more substances selected from the group consisting of polybutylene, polystyrene (PS), polyethylene terephthalate glycol copolymers (PETG), styrene butadiene styrene copolymers (SBS), cyclic olefin copolymers (COC), polymethyl methacrylate (PMMA), styrene methyl methacrylate, acrylonitrile butadiene styrene (ABS), and talc, the intermediate layer having an internal cohesive strength less than a bond strength of the intermediate layer to either the support layer or the heat-sealable layer and less than the internal cohesive strength of either the support layer or the heat-sealable layer;
   wherein:
      the support layer represents from 70 to 94% by weight of the multilayer film;
      the polyethylene heat-seal layer represents from 3 to 15% by weight, of the multilayer film; and the intermediate layer represents from 3 to 15% by weight of the multilayer film;

a total weight percentage of the support layer, the heat-seal layer, and the intermediate layer being 100.

12. A heat-sealed package comprising the heat-sealable multilayer film according to claim 1, and a substrate, in contact with the heat-seal layer, the substrate being selected from the group consisting of an additional polymeric film, coated paper, uncoated paper, paperboard, metallic foil, cellulosic non-woven, polymeric non-woven and woven fabric.

13. The heat-sealed package according to claim 12, wherein the substrate is an additional polymeric film selected from the group consisting of polyethylene, polyamide, polyester, polycarbonate, polyvinyl chloride, ethylene vinyl acetate, and high-impact polystyrene.

14. The heat-sealed package according to claim 12, wherein a peel strength, measured according to ASTM F88, is between 2.0 and 6.0 N/15 mm, the rupture being internal the intermediate peelable layer.

15. Method for producing the heat-sealed package according to claim 12, comprising contacting the substrate with the heat-seal layer of the heat-sealable multilayer film of claim 1, and sealing at a temperature between 100 and 180° C. using a dwell time between 0.2 and 3 seconds and a pressure between 100 and 600 kPa, and cooling down the heat-sealed package.

16. The method according to claim 15, further comprising subjecting the heat-seal layer to a plasma treatment before contacting with the substrate.

17. The method of claim 16, wherein the plasma treatment comprises a corona-plasma treatment.

* * * * *